(12) United States Patent
Ferman et al.

(10) Patent No.: US 7,856,142 B2
(45) Date of Patent: Dec. 21, 2010

(54) METHODS AND SYSTEMS FOR DETECTING CHARACTER CONTENT IN A DIGITAL IMAGE

(75) Inventors: Ahmet Mufit Ferman, Vancouver, WA (US); Richard John Campbell, Camas, WA (US); Jon M. Speigle, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 956 days.

(21) Appl. No.: 11/627,456

(22) Filed: Jan. 26, 2007

(65) Prior Publication Data

US 2008/0181496 A1    Jul. 31, 2008

(51) Int. Cl.
*G06K 9/00* (2006.01)
*G06K 9/62* (2006.01)
*G06K 9/34* (2006.01)

(52) U.S. Cl. ...................... 382/168; 382/224

(58) Field of Classification Search ......... 382/162, 382/164, 165, 168, 173, 176, 180–182, 187, 382/189, 199, 202, 205, 218–220, 224–225, 382/266, 272; 358/1.9, 2.1, 3.06, 3.27, 462, 358/464, 534; 345/426
See application file for complete search history.

(56) References Cited

U.S. PATENT DOCUMENTS

| 4,030,068 A | * | 6/1977 | Banz | 382/227 |
|---|---|---|---|---|
| 4,389,634 A | * | 6/1983 | Nakamura | 382/182 |
| 4,490,850 A | * | 12/1984 | Nally et al. | 382/196 |
| 4,644,410 A | * | 2/1987 | Schlichtig | 382/273 |
| 5,268,967 A | * | 12/1993 | Jang et al. | 382/132 |
| 5,293,430 A | | 3/1994 | Shiau et al. | |
| 5,566,255 A | | 10/1996 | Pavlidis | |
| 5,724,457 A | * | 3/1998 | Fukushima | 382/311 |
| 5,768,414 A | * | 6/1998 | Jamali | 382/173 |
| 5,852,678 A | | 12/1998 | Shiau et al. | |
| 5,956,468 A | | 9/1999 | Ancin | |
| 6,295,371 B1 | | 9/2001 | Rucklidge et al. | |
| 6,333,993 B1 | * | 12/2001 | Sakamoto | 382/173 |
| 6,704,456 B1 | | 3/2004 | Venable | |
| 6,731,800 B1 | | 5/2004 | Barthel et al. | |
| 6,839,466 B2 | | 1/2005 | Venable | |
| 6,853,755 B2 | | 2/2005 | Li | |
| 6,859,204 B2 | | 2/2005 | Curry et al. | |
| 6,973,213 B2 | | 12/2005 | Fan et al. | |
| 6,993,185 B2 | | 1/2006 | Guo et al. | |
| 7,079,687 B2 | | 7/2006 | Guleryuz | |
| 2005/0226503 A1 | | 10/2005 | Bailey et al. | |
| 2007/0172128 A1 | * | 7/2007 | Hirao | 382/202 |
| 2008/0181496 A1 | * | 7/2008 | Ferman et al. | 382/168 |
| 2009/0016611 A1 | * | 1/2009 | Campbell | 382/199 |
| 2009/0110319 A1 | * | 4/2009 | Campbell et al. | 382/260 |
| 2009/0110320 A1 | * | 4/2009 | Campbell et al. | 382/260 |

FOREIGN PATENT DOCUMENTS

JP    10-222688 A    8/1998

OTHER PUBLICATIONS

Japanese Patent Application No. 2008-010940—Office action—Mailing date Oct. 6, 2009.

* cited by examiner

*Primary Examiner*—Amir Alavi
(74) *Attorney, Agent, or Firm*—Kristine E. Matthews; David C. Ripma

(57) ABSTRACT

Embodiments of the present invention comprise systems and methods for detecting glyph pixels in a rasterized image.

21 Claims, 10 Drawing Sheets

METHODS AND SYSTEMS FOR DETECTING CHARACTER CONTENT IN A DIGITAL IMAGE

FIELD OF THE INVENTION

Embodiments of the present invention comprise methods and systems for detecting glyph pixels on a rasterized page.

BACKGROUND

The content of a digital image may have considerable impact on the compression of the digital image, both in terms of compression efficiency and compression artifacts. Pictorial regions in an image may not be efficiently compressed using compression algorithms designed and optimized for the compression of text. Similarly, text images may not be efficiently compressed using compression algorithms that are designed and optimized for pictorial content. Not only can the compression efficiency suffer when a compression algorithm designed for one type of image content is used on a different type of image content, but the decoded image may exhibit annoying compression artifacts.

Additionally, image enhancement algorithms designed to sharpen text, if applied to pictorial image content, may produce visually annoying artifacts in some areas of the pictorial content. In particular, areas in a pictorial region containing strong edges similar to text may be sharpened producing a visually displeasing image. While smoothing operations may enhance a natural image, the smoothing of text regions is seldom desirable.

The detection of regions of a particular content type in a digital image may improve compression efficiency, reduce compression artifacts, and improve image quality when used in conjunction with a compression algorithm or image enhancement algorithm designed for the particular type of content.

Also, the semantic labeling of image regions based on content may be useful in document management systems and image databases.

SUMMARY

Some embodiments of the present invention comprise methods and systems for classifying pixels in a digital image. In some embodiments, a pixel may be classified based on comparison of the color of the pixel to the color of the local background in a region substantially near to the pixel. In some embodiments, a pixel may be classified based on a measure of the color contrast in a region substantially near to the pixel. In some embodiments, a pixel may be classified based on a large-text-character condition. In some embodiments, a pixel may be classified based on a comparison to a dynamic threshold which may be calculated using the contrast and range of color values in a region substantially near to the pixel.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention may comprise methods and systems for detecting pixels that are part of a text character or symbol in a scanned-document image. These pixels may be referred to as glyph pixels for the purposes of this description, associated drawings and claims. Glyph detection may be complicated by the often complex nature of scanned-document images which may contain a variety of content types (e.g., halftone, pictures, graphics, text, etc.) and artifacts introduced during the scanning process (e.g., noise, optical blur, color fringing, etc.).

Figure 1:
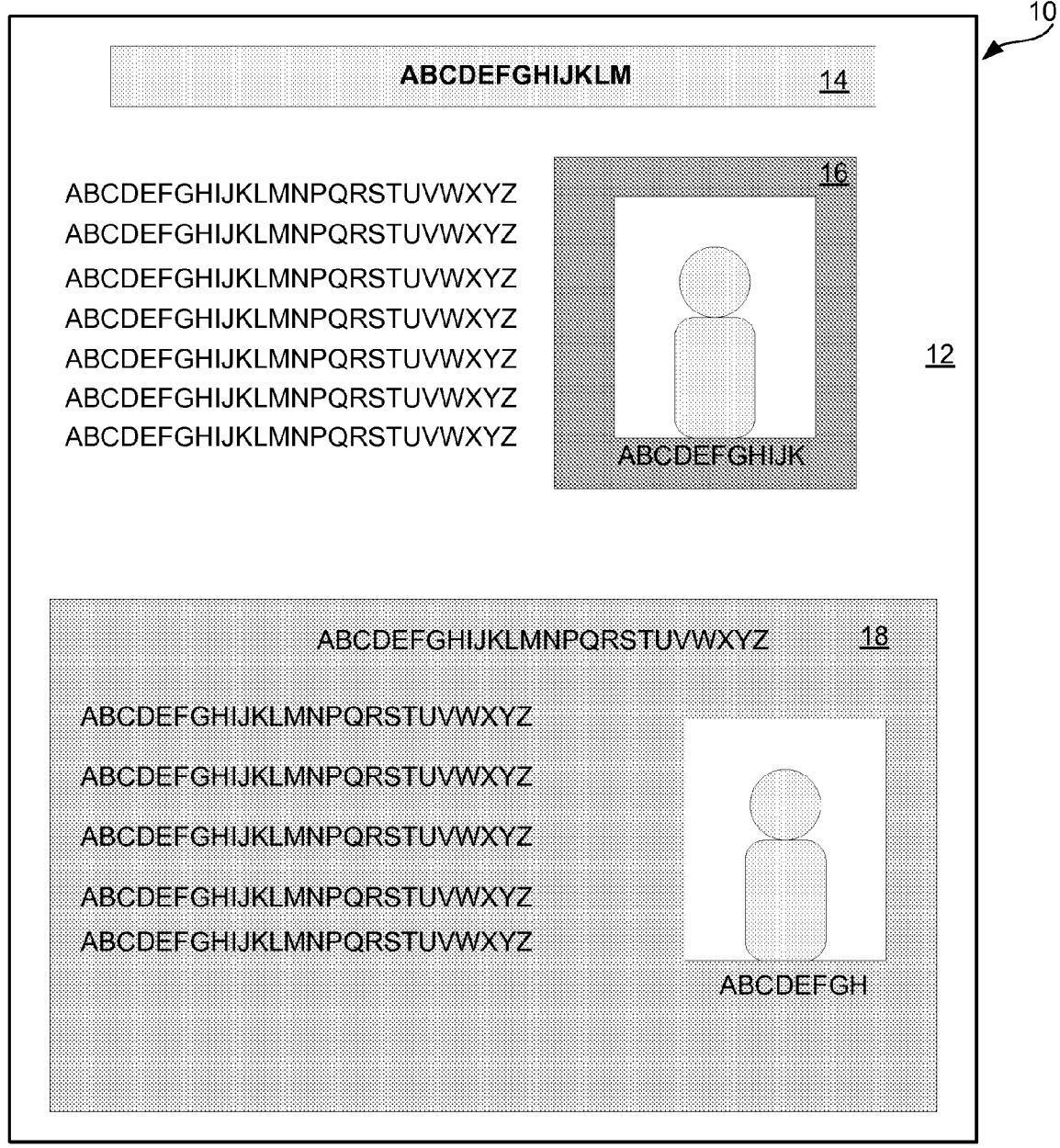
FIG. 1 is a drawing showing an exemplary document image comprising a page background color and a plurality of local background regions.

Some embodiments of the present invention may be described in relation to FIG. 1 which shows an exemplary image 10. The image 10 is a document image comprising several regions including: a page background region 12 of a first uniform color, which may be the color of the paper stock on which the document is printed; a first local background region 14 of a second uniform color; a second local background region 16 of a third uniform color; and a third local background region 18 of a fourth uniform color. Due to imperfections in the printing and scanning processes, all of the pixels comprising an image region of uniform color, for example a local background region, may not have the same color value. The color values of the pixels may form a small distribution around a central or peak color value. Embodiments of the present invention may assign, to pixels with color values in the small distribution, membership in a color class representing the uniform color in the image region. In a local background region, the color class may be referred to as a local background color estimate. In the page background region, the color class may be referred to as the page background color estimate.

Some embodiments of the present invention may comprise a comparison between two color values. Prior to comparison, either one or both of the two color values may require conversion from another color space to a common color space in which the comparison may be made. Some embodiments of the present invention may comprise calculations using color values. A color value may require conversion from one color space to another color space prior to the calculation. Exemplary color spaces may comprise RGB, Yuv, L*a*b*, YCbCr, Lab, XYZ, YIQ, any luma-chroma-chroma color space and any other color space known in the art including luminance-only and other single-channel color spaces.

In some embodiments of the present invention, a comparison of two color values may comprise a comparison of all color components. In alternative embodiments, a comparison of two color values may comprise a comparison of a subset of color components. For example, the comparison may comprise a comparison of only the luminance component in a luma-chroma-chroma color space or the green component in an RGB color space. Similarly, in some embodiments of the present invention, a calculation using color values may comprise a calculation using all of the color components. In alternative embodiments, a calculation using color values may comprise a calculation using a subset of color components. For example, the calculation may comprise a calculation using only the luminance component in a luma-chroma-chroma color space or the green component in an RGB color space.

Figures 2, 4A:
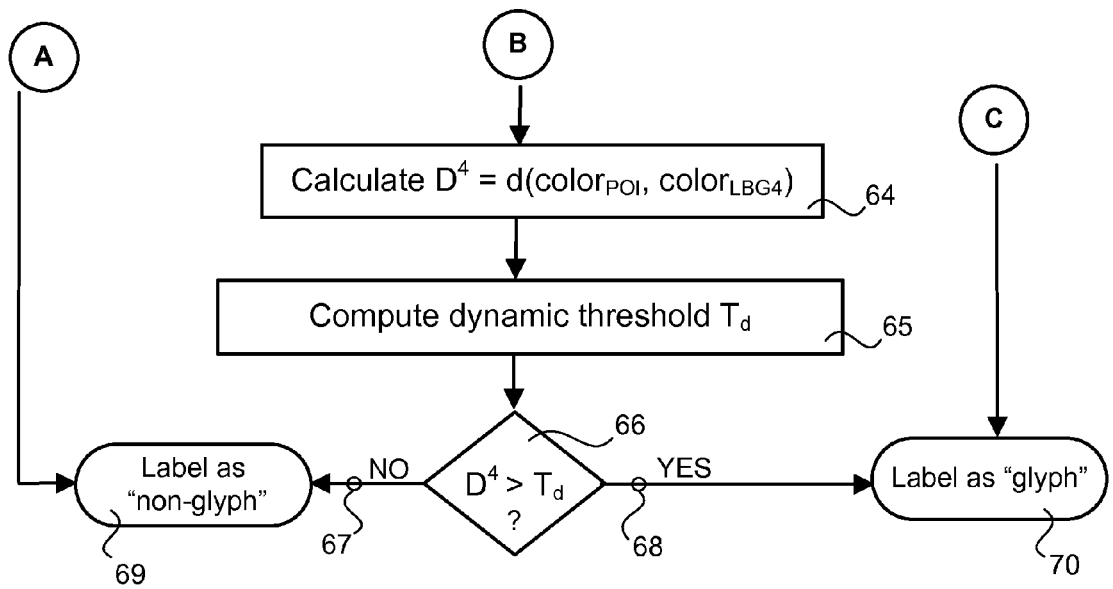
FIG. 2 is a drawing showing a pixel of interest and an exemplary neighborhood surrounding the pixel of interest.
FIG. 4 and FIG. 4A are a diagram showing embodiments of the present invention comprising four sequential comparisons which may be used to classify a pixel of interest.

Some embodiments of the present invention may comprise examining the color data of pixels within a local neighborhood, or region, surrounding a pixel of interest. FIG. 2 depicts an exemplary local neighborhood 20 of pixels 21-28 surrounding a pixel of interest 29. A local neighborhood, or region, may be of any size or shape. The exemplary local neighborhood 20 in FIG. 2 is a 3×3 neighborhood surrounding the pixel of interest 29. Other exemplary local neighborhoods may comprise an N×N, where N is an integer, neighborhood, an N×M, where N and M are integers, neighborhood, a circular-shaped region, an n-nearest neighbors region, an irregular-shaped region of previously classified, also considered labeled, pixels and any other local neighborhood of any shape or size surrounding the pixel of interest. Statistics calculated from the pixel data in the local neighborhood 20 may be used to classify, or label, the pixel of interest 29 as a "glyph" pixel or a "non-glyph" pixel. In some embodiments, the pixel of interest 29 may be classified, or labeled, as a "glyph" pixel, a "non-glyph" pixel or an "unknown" pixel. In some embodiments, all of the pixels in the local neighborhood 20 may classified, or labeled, according to the label assigned to the pixel of interest 29.

In some embodiments of the present invention, each pixel in a digital image may be examined to determine its status as a glyph pixel. In alternative embodiments, a selective subset of pixels in a digital image may be examined. In some of these alternative embodiments, the selective group of pixels for examination may comprise pixels which may have been previously identified as candidate text pixels.

Figure 3:
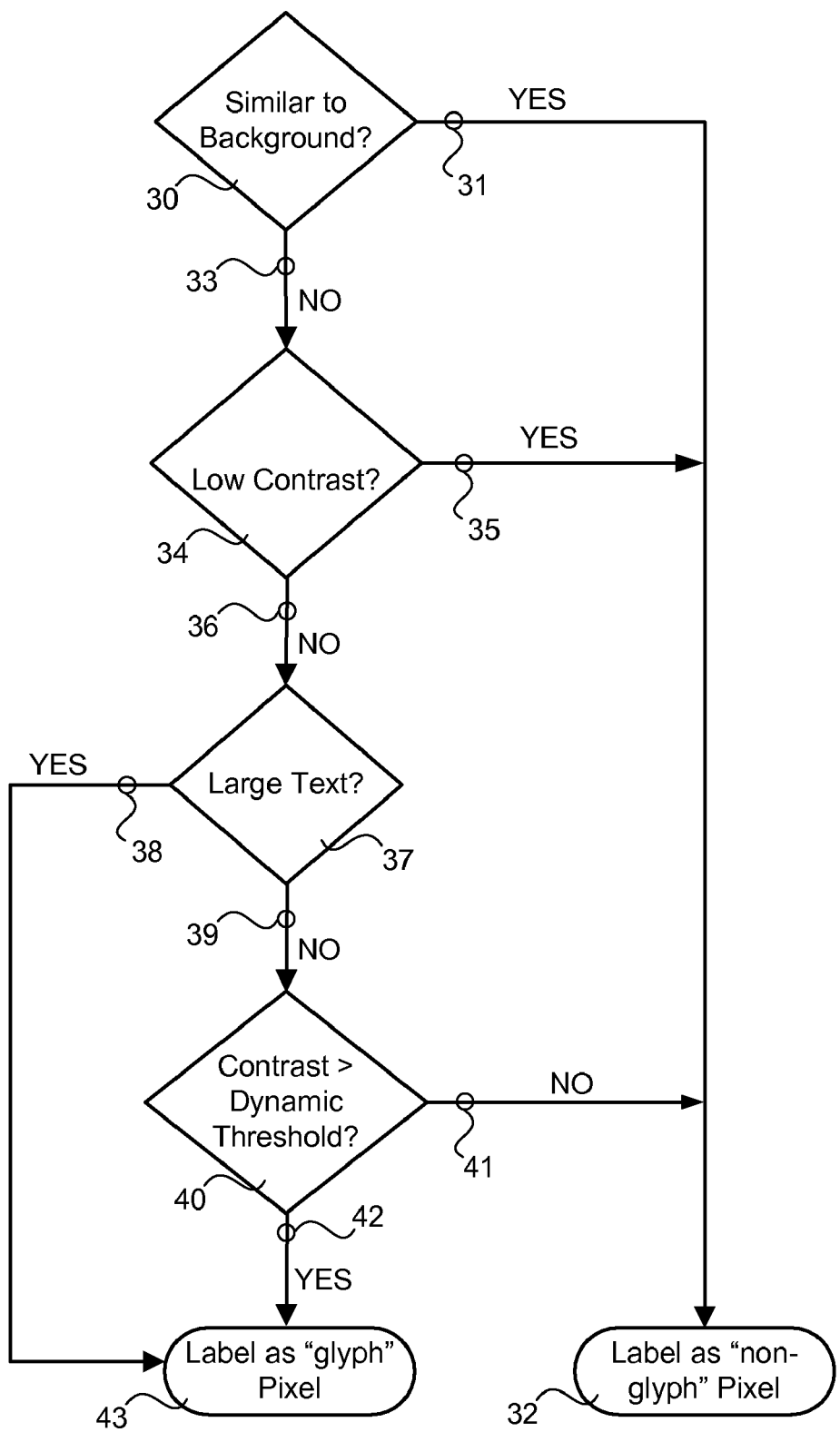
FIG. 3 is a diagram showing embodiments of the present invention comprising four sequential comparisons which may be used to classify a pixel of interest.

Some embodiments of the present invention may be described in relation to FIG. 3. The similarity of the color of a pixel of interest and the local background color estimate for a first neighborhood substantially proximate to the pixel of interest may be determined 30. If the color of the pixel of interest and the local background color estimate for the first neighborhood are similar 31, then the pixel of interest may be labeled as a "non-glyph" pixel 32. If the color of the pixel of interest and the local background color estimate for the first neighborhood are not similar 33, then a calculation of the contrast in a second neighborhood substantially proximate to the pixel of interest may be made 34. In some embodiments, the first neighborhood and the second neighborhood may be the same. In alternative embodiments, the first neighborhood may be distinct from the second neighborhood. If the contrast in the second neighborhood is determined 34 to be low 35, then the pixel of interest may be labeled as a "non-glyph" pixel 32. If the contrast is determined 34 to be high 36, then a determination of whether the pixel of interest is part of a large text or symbol character 37 may be made. Determination of whether the pixel of interest is part of a large text or symbol character 37 may comprise comparisons of pixel color values in a third neighborhood substantially proximate to the pixel of interest. If it is determined 37 that the pixel of interest is part of a large text or symbol character 38, then the pixel of interest may labeled as a "glyph" pixel 43. If it is determined 37 that the pixel of interest is not part of a large text or symbol character 39, then the contrast between the pixel of interest and the local background in a fourth neighborhood substantially proximate to the pixel of interest may be compared to a dynamic threshold 40. In some embodiments, if the contrast is greater than the dynamic threshold 42, then the pixel of interest may be labeled as a "glyph" pixel 43. If the contrast is less than or equal to the dynamic threshold 41, then the pixel of interest may be labeled as a "non-glyph" pixel 32. In some embodiments of the present invention, the first, the second, the third and the fourth neighborhoods may be the same neighborhood. In alternative embodiments, some of the four neighborhoods may be distinct.

Figure 4:
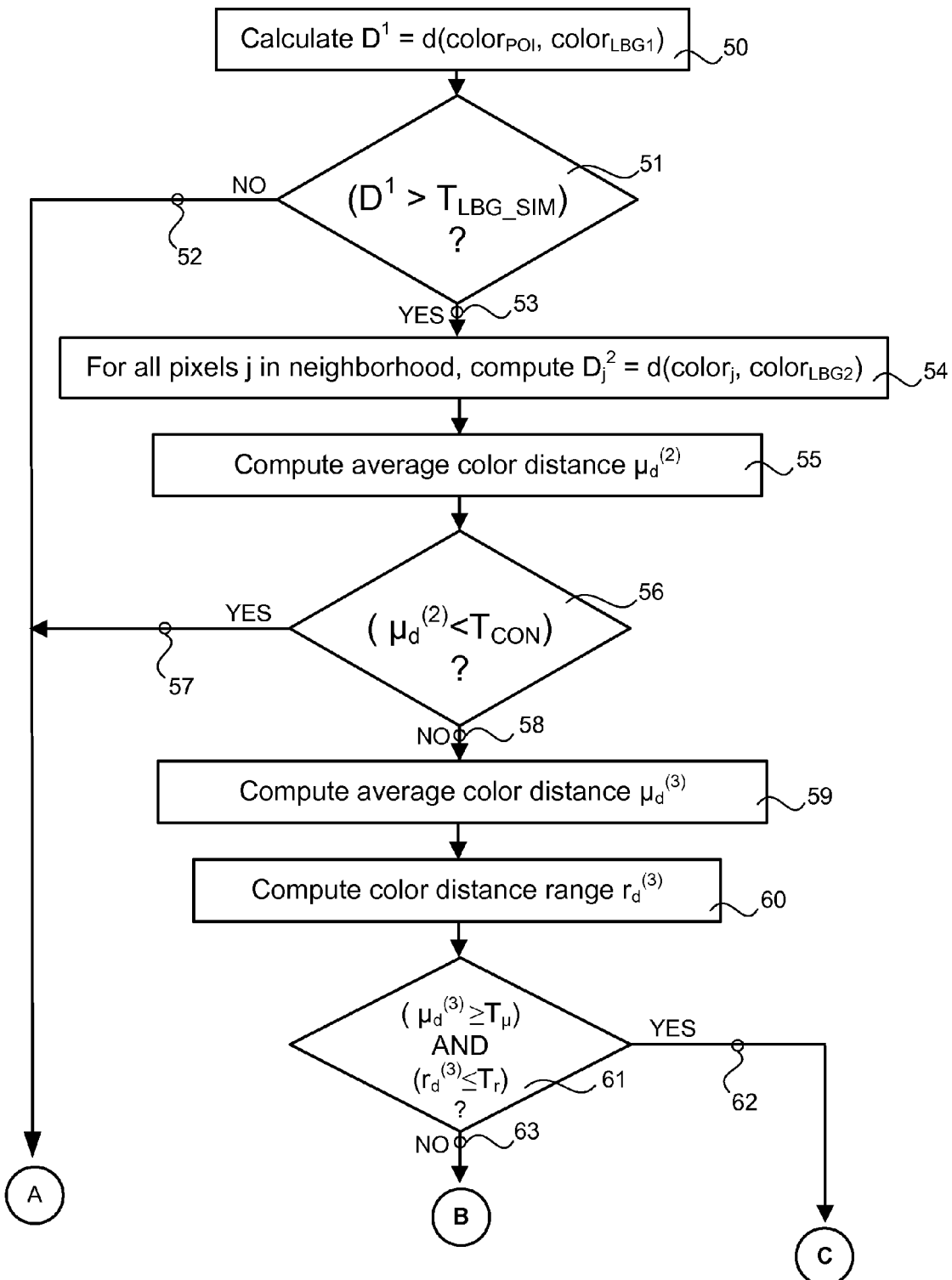

Some embodiments of the present invention may be described in relation to FIG. 4 and FIG. 4A. For a pixel of interest in a digital image, the similarity between the color of a pixel of interest, denoted $c_{POI}$, and a color estimate of the local background color in a first neighborhood substantially proximate to the pixel of interest, denoted $c_{LBG1}$, may be determined. The similarity may be calculated 50 as the distance, $D^1$, between the color of the pixel of interest, $c_{POI}$, and the color estimate of the local background color in the first neighborhood, $c_{LBG1}$, where the distance between the two color values may be denoted $d(c_{POI}, c_{LBG1})$. In some embodiments, the local background color estimate may be available as a single color value, $c_{LBG1}$ for the entire first neighborhood. In alternative embodiments, a local background color estimate may be available at each pixel in the first neighborhood. The color estimate of the local background in the first neighborhood may be calculated as a combination of the available local background color estimate values at each pixel in the neighborhood. Exemplary combinations include the mean, median, weighted mean and other combinations of the individual local background estimate values.

Any distance measure known in the art may be used to determine the distance, $D^1 = d(c_{POI}, c_{LBG1})$, between the color of the pixel of interest, $c_{POI}$, and the background color estimate, $c_{LBG1}$. Exemplary distance measures may comprise a 2-dimensional city block distance measure between the chroma components of a luma-chroma-chroma color space representation, a 3-dimensional city block distance measure between the components of a 3-dimensional color space representation, a Euclidean distance measure, a weighted 2-dimensional city block distance measure between the chroma components of a luma-chroma-chroma color space representation, a weighted 3-dimensional city clock distance between the components of a 3-dimensional color space representation and other well-known-in-the-art distance measures.

In some embodiments of the present invention, the distance, $D^1=d(c_{POI}, c_{LBG1})$, may be compared 51 to a similarity threshold, denoted $T_{LBG\_SIM}$, to determine if the color of the pixel of interest is substantially similar to the color of the background. In some embodiments, the similarity threshold, $T_{LBG\_SIM}$, may be a fixed threshold. In alternative embodiments, the similarity threshold, $T_{LBG\_SIM}$, may be an adaptive threshold. In some embodiments, if the distance, $D^1=d(c_{POI}, c_{LBG1})$, is less than the similarity threshold, $T_{LBG\_SIM}$, 52 which may indicate that the color of the pixel of interest is close to the color of the local background in the neighborhood near to the pixel of interest, then the pixel of interest may be labeled as a "non-glyph" pixel 69. If the distance, $D^1=d(c_{POI}, c_{LBG1})$, is not small (e.g., $D^1 > T_{LBG\_SIM}$) 53, then additional processing may be required.

In alternative embodiments, the comparison 51 may additionally comprise a condition related to the page background color. In these alternative embodiments, if the distance, $D^1=d(c_{POI}, c_{LBG1})$, is less than the similarity threshold, $T_{LBG\_SIM}$, or the local background color estimate, $c_{LBG1}$ is not equal to page background color, denoted $c_{PBG}$, then the pixel of interest may be labeled as a "non-glyph" pixel 69. This additional condition in the comparison 51 may generate more robust detection of glyph pixels when the local background color estimate contains uncertainty or error. In alternative embodiments, if the distance, $D^1=d(c_{POI}, c_{LBG1})$, is not small (e.g., $D^1 > T_{LBG\_SIM}$) or $c_{LBG1}=c_{PBG}$, then additional processing may be required 53.

In some embodiments of the present invention, a calculation of the contrast in a second neighborhood substantially proximate to the pixel of interest may be made. The contrast calculation may comprise computing 55 the average color distance of the pixels in the second neighborhood from the local background color estimate, denoted $c_{LBG2}$, in the second neighborhood 54. In some embodiments, the local background color estimate may be available as a single color value, $c_{LBG2}$, for the entire second neighborhood. In alternative embodiments, a local background color estimate may be available at each pixel in the second neighborhood. The color estimate of the local background in the second neighborhood may be calculated as a combination of the available local background color estimate values at each pixel in the neighborhood. Exemplary combinations include the mean, median, weighted mean and other combinations of the individual values.

The average color distance in the second neighborhood, $\mu_d^{(2)}$, may be calculated 55 according to:

$$\mu_d^{(2)} = \frac{\sum_{\forall j \in NH2} d(c_j, c_{LBG2})}{\# \text{ of pixels in } NH2},$$

where NH2 denotes the second neighborhood, $c_j$ denotes the color value of pixel j where pixel j is in neighborhood NH2 and $d(\cdot,\cdot)$ is a distance measure. Exemplary distance measures may comprise a 2-dimensional city block distance measure between the chroma components of a luma-chroma-chroma color space representation, a 3-dimensional city block distance measure between the components of a 3-dimensional color space representation, a Euclidean distance measure, a weighted 2-dimensional city block distance measure between the chroma components of a luma-chroma-chroma color space representation, a weighted 3-dimensional city clock distance between the components of a 3-dimensional color space representation and other well-known-in-the-art distance measures.

For an N×M rectangular neighborhood, the average color distance may be calculated 55 according to:

$$\mu_d = \frac{\sum_{j=1}^{M \cdot N} d(c_j, c_{LBG2})}{M \cdot N}.$$

The calculated average color distance, $\mu_d^{(2)}$, may be compared 56 to a contrast threshold, denoted $T_{CON}$, to determine if the second neighborhood around the pixel of interest is of low contrast compared to the local background estimate. In some embodiments, the contrast threshold, $T_{CON}$, may be a fixed threshold. In alternative embodiments, the contrast threshold, $T_{CON}$, may be an adaptive threshold. In some embodiments, if the average color distance, (2) is small 57, which may indicate that the color of the pixel of interest is of low contrast compared to the background, then the pixel of interest may be labeled as a "non-glyph" pixel 69. If the average color distance, $\mu_d^{(2)}$, is not small 58, then additional processing may be required. In alternative embodiments of the present invention, if the average color distance, $\mu_d^{(2)}$, is small and the page background color, $c_{PBG}$, is not equal to the local background color estimate, $c_{LBG2}$, which may indicate that the color of the pixel of interest is of low contrast compared to the background and that the pixel of interest is on a halftone region, then the pixel of interest may be labeled as a "non-glyph" pixel 69. In these alternative embodiments, if the average color distance, $\mu_d^{(2)}$, is not small or the page background color, $c_{PBG}$, is equal to the local background color estimate, $c_{LGB2}$, then additional processing may be required.

In some embodiments of the present invention, if additional processing is required 58, then a determination of whether the pixel of interest is part of a large text or symbol character may be made. Determination of whether the pixel of interest is part of a large text or symbol character may comprise computing 59 the average color distance, $\mu_d$, as described above. The average color distance, $\mu_d$, may be computed 59 in a third neighborhood substantially proximate to the pixel of interest and may be denoted $\mu_d^{(3)}$. Determination of whether the pixel of interest is part of a large text or symbol character may further comprise computing 60 the range of the color distances of the color of the pixels in the third neighborhood from the local background color estimate for the third neighborhood. The range of color distances may be determined 60 according to:

$$r_d^{(3)} = d_{max}^{(3)} - d_{min}^{(3)},$$

where $$d_{min}^{(3)} = \min_j(d(c_j, c_{LBG3})), \quad d_{max}^{(3)} = \max_j(d(c_j, c_{LBG3}))$$

and $c_{LBG3}$ is the local background color estimate in the third neighborhood. In some embodiments of the present invention, a pixel of interest may be considered part of a large text or symbol character if the range of color distances, $r_d^{(3)}$, is small and the average color distance, $\mu_d^{(3)}$, is large 62. This condition may be checked by comparing 61 $r_d^{(3)}$ to a color-range threshold, $T_r$, and $\mu_d^{(3)}$ to an average-distance threshold, $T_\mu$. If the range of color distances, $r_d^{(3)}$, is small and the average color distance, $\mu_d^{(3)}$, is large 62, then the pixel of interest may be labeled as a "glyph" pixel 70. If not 63, additional processing may be required.

In some embodiments, if it is determined that the pixel of interest is not part of a large text or symbol character 63, then the contrast between the pixel of interest and the local background color, $c_{LBG4}$, in a fourth neighborhood substantially proximate to the pixel of interest may be compared to a dynamic threshold 66. In some embodiments the contrast between the pixel of interest and the local background may comprise the color distance, $D^4=d(c_{POI}, c_{LBG4})$ 64. In some embodiments, the dynamic threshold, $T_d$, may be calculated 65 according to:

$$T_d = d_{min}^{(4)} + \frac{r_d^{(4)}}{R},$$

where $r_d^{(4)}$ and $d_{min}^{(4)}$ may be calculated as described above, and R is a predefined constant. In some embodiments of the present invention, if $D^4 > T_d$ 68, then the pixel of interest may be labeled a "glyph" pixel 70. Otherwise 67, the pixel of interest may be labeled a "non-glyph" pixel 69.

Figure 5:
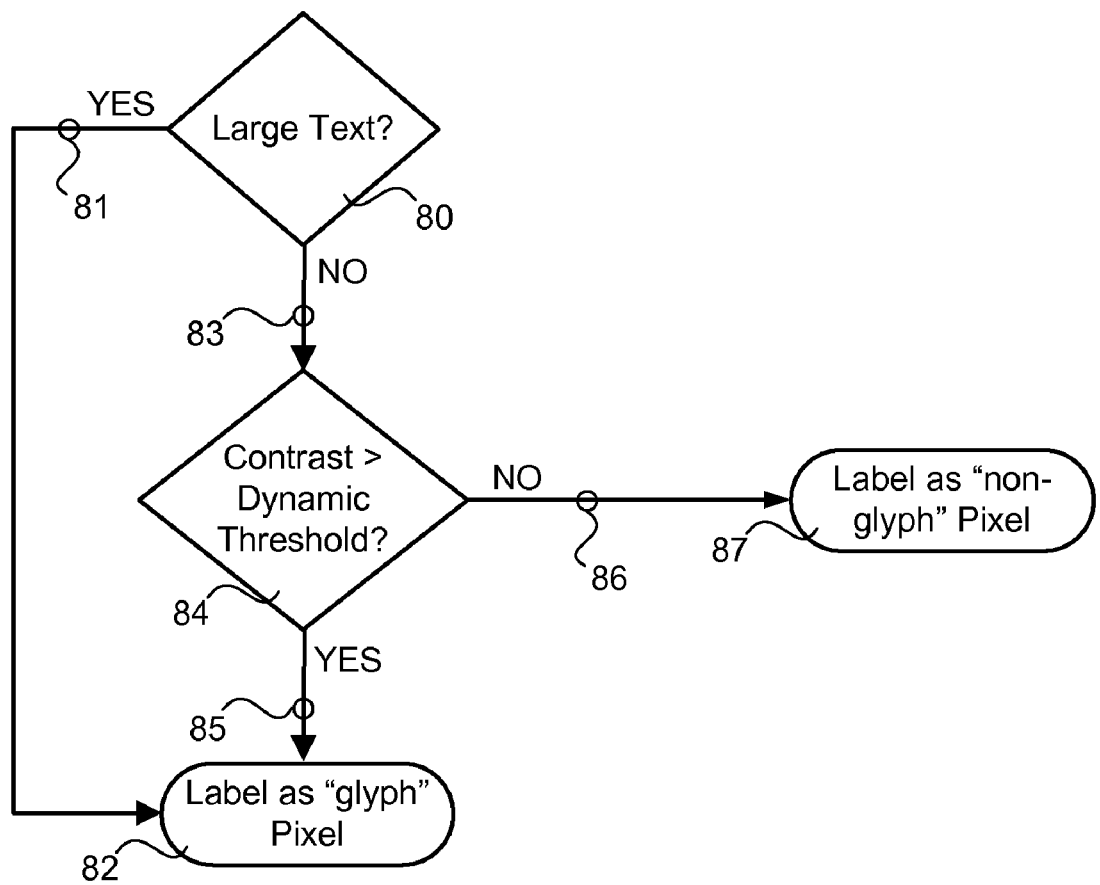
FIG. 5 is a diagram showing embodiments of the present invention comprising two sequential comparisons which may be used to classify a pixel of interest.

Some embodiments of the present invention may be described in relation to FIG. 5. In these embodiments, determination 80 of whether a pixel of interest is part of a large text or symbol character may be made. Determination 80 of whether the pixel of interest is part of a large text or symbol character may comprise comparisons of the color values of a plurality of pixels in a first neighborhood substantially proximate to the pixel of interest. If it is determined 80 that the pixel of interest is part of a large text or symbol character 81, then the pixel of interest may labeled as a "glyph" pixel 82. If it is determined 80 that the pixel of interest is not part of a large text or symbol character 83, then the contrast between the pixel of interest and the local background in a second neighborhood substantially proximate to the pixel of interest may be compared 84 to a dynamic threshold. In some embodiments, if the contrast is greater than the dynamic threshold 85, then the pixel of interest may be labeled as a "glyph" pixel 82. If the contrast is less than or equal to the dynamic threshold 86, then the pixel of interest may be labeled as a "non-glyph" pixel 87. In alternative embodiments, if the contrast is greater than or equal to the dynamic threshold, then the pixel of interest may be labeled as a "glyph" pixel 82. If the contrast is less than the dynamic threshold, then the pixel of interest may be labeled as a "non-glyph" pixel 87. In some embodiments of the present invention, the first neighborhood and the second neighborhood may be the same neighborhood. In alternative embodiments, the two neighborhoods may be distinct.

Figure 8:
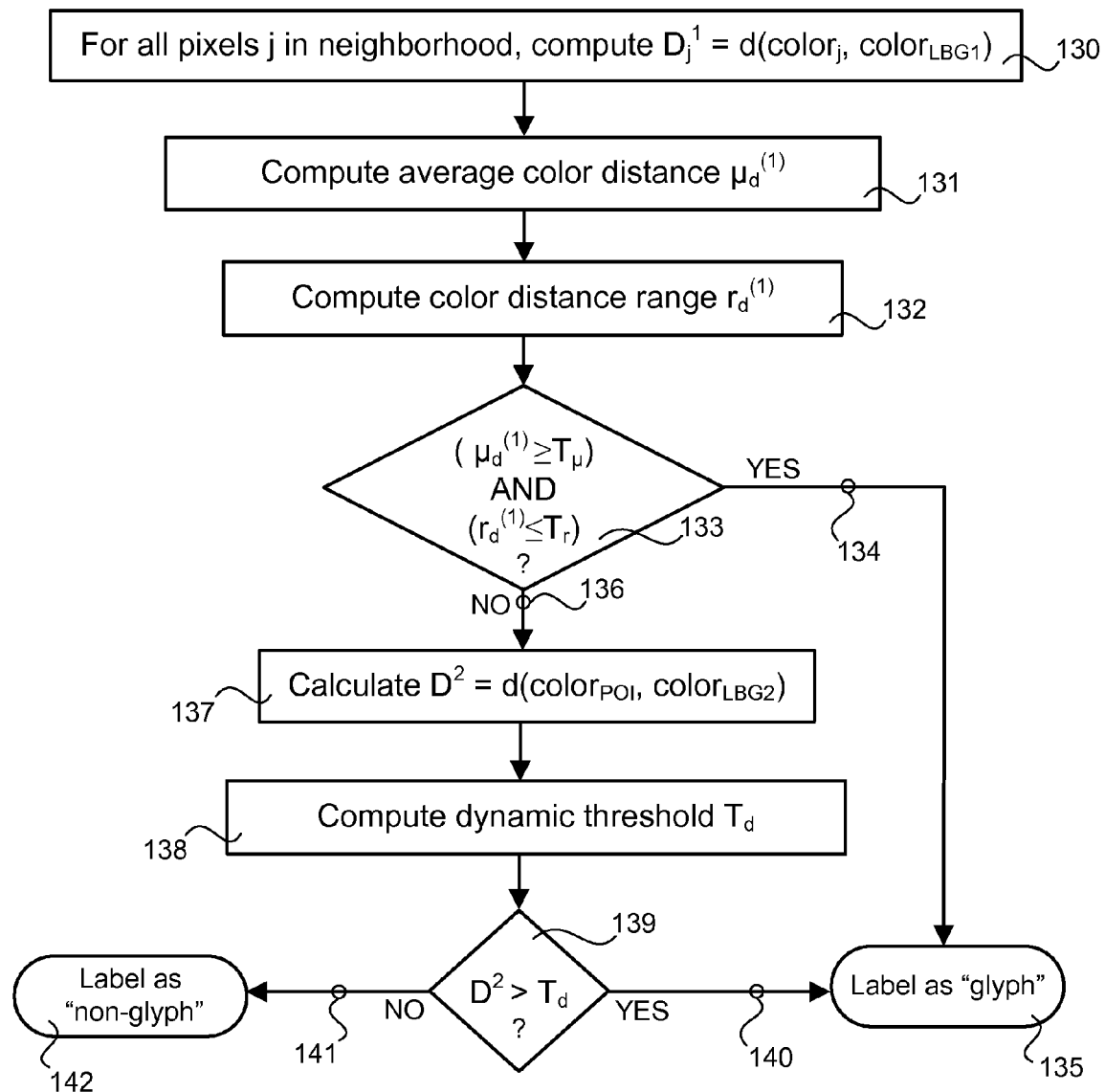
FIG. 8 is a diagram showing embodiments of the present invention comprising two sequential comparisons which may be used to classify a pixel of interest.

In some embodiments of the present invention shown in FIG. 8, determination of whether a pixel of interest is part of a large text or symbol character may comprise computing the average color distance, $\mu_d$, as described above, by first computing 130 the distance between the color of each pixel in a first neighborhood substantially proximate to the pixel of interest from the local background color estimate for the first neighborhood. The average color distance, $\mu_d$, may be computed 131 in the first neighborhood substantially proximate to the pixel of interest and may be denoted $\mu_d^{(1)}$. Determination of whether the pixel of interest is part of a large text or symbol character may further comprise computing 132 the range of color distances of the pixels in the first neighborhood surrounding the pixel of interest from the local background color estimate for the first neighborhood. The range of color distances may be determined 132 according to:

$$r_d^{(1)} = d_{max}^{(1)} - d_{min}^{(1)},$$

$$d_{min}^{(1)} = \min_j(d(c_j, c_{LBG1})), \quad d_{max}^{(1)} = \max_j(d(c_j, c_{LBG1}))$$

where and $c_{LBG1}$ is the local background color estimate in the first neighborhood. In some embodiments of the present invention, a pixel of interest may be considered part of a large text or symbol character if the range of color distances, $r_d^{(1)}$, is small and the average color distance, $\mu_d^{(1)}$, is large. This condition may be checked by comparing 133 $r_d^{(1)}$ to a color-range threshold, $T_r$, and $\mu_d^{(1)}$ to an average-distance threshold, $T_\mu$. If the range of color distances, $r_d^{(1)}$, is small and the average color distance, $\mu_d^{(1)}$, is large 134, then the pixel of interest may be labeled as a "glyph" pixel 135. If not 136, additional processing may be required.

In some embodiments, if it is determined that the pixel of interest is not part of a large text or symbol character 136, then the contrast between the pixel of interest and the local background color, $c_{LBG2}$, in a second neighborhood substantially proximate to the pixel of interest may be compared to a dynamic threshold 139. In some embodiments the contrast between the pixel of interest and the local background may comprise the color distance, $D^2=d(c_{POI}, c_{LBG2})$ 137. In some embodiments, the dynamic threshold, $T_d$, may be calculated 138 according to:

$$T_d = d_{min}^{(2)} + \frac{r_d^{(2)}}{R},$$

where $r_d^{(2)}$ and $d_{min}^{(2)}$ may be calculated as described above, and R is a predefined constant. In some embodiments of the present invention, if $D^2 > T_d$ 140, then the pixel of interest may be labeled a "glyph" pixel 135. Otherwise 141, the pixel of interest may be labeled a "non-glyph" pixel 142.

Some embodiments of the present invention may comprise pre-classification of a pixel of interest prior to determination of whether the pixel of interest is part of a large text or symbol character. In some embodiments, the pre-classification may classify a pixel of interest as a "non-glyph" pixel which may thereby eliminate the necessity of further examination of the pixel of interest. Exemplary pre-classifications may comprise pre-classification based on an a priori content-based labeling of the pixel of interest and pre-classification based on a measured feature value strongly inconsistent with membership in a "glyph."

Figure 6:
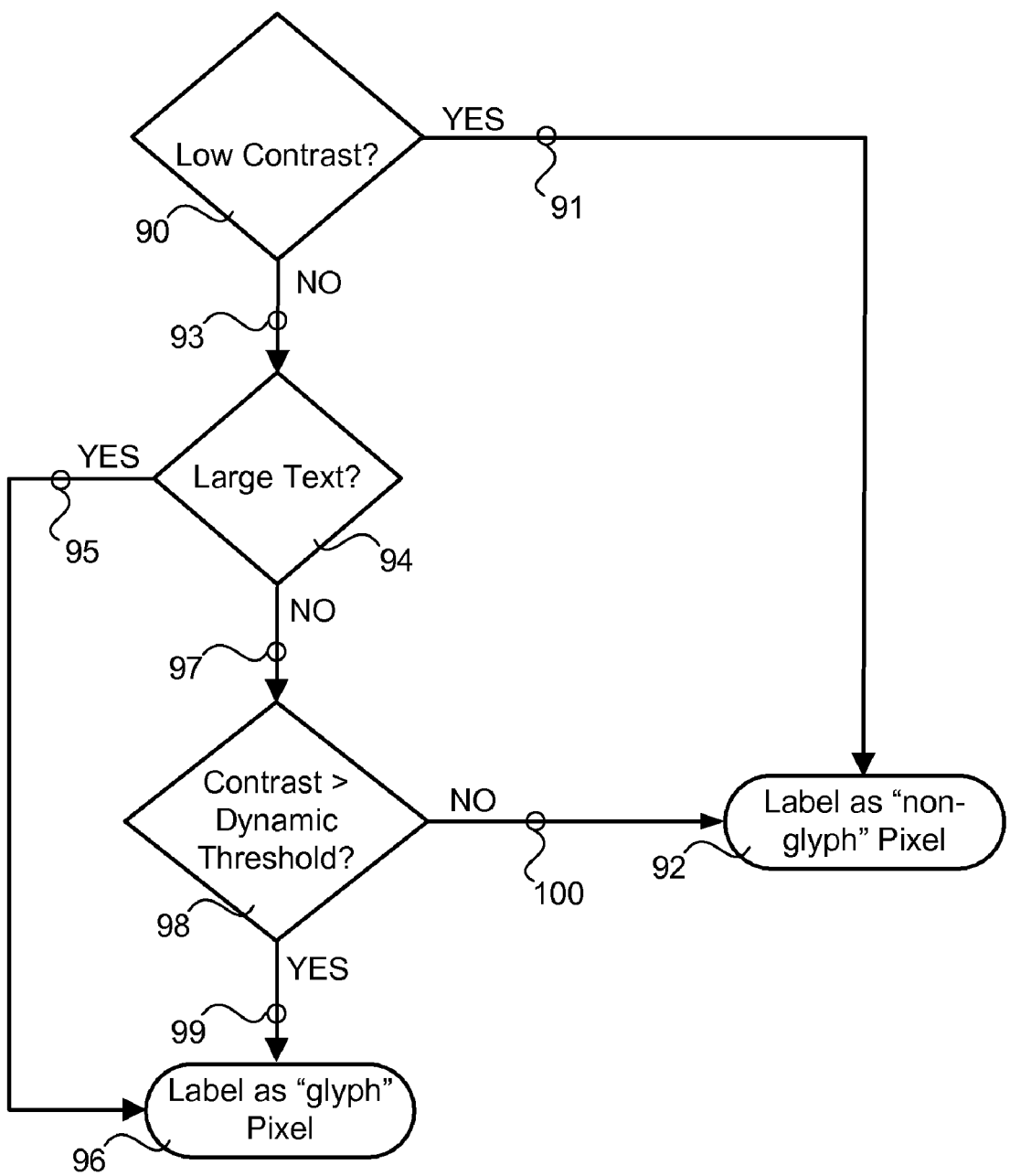
FIG. 6 is a diagram showing embodiments of the present invention comprising three sequential comparisons which may be used to classify a pixel of interest.

Some embodiments of the present invention may be described in relation to FIG. 6. In these embodiments, a calculation of the contrast in a first neighborhood substantially proximate to a pixel of interest may be made 90. If the contrast in the first neighborhood is determined 90 to be low 91, then the pixel of interest may be labeled as a "non-glyph" pixel 92. If the contrast is determined 90 to be high 93, then a determination of whether the pixel of interest is part of a large text or symbol character 94 may be made. Determination of whether the pixel of interest is part of a large text or symbol character 94 may comprise comparisons of pixel color values in a second neighborhood substantially proximate to the pixel of interest. If it is determined 94 that the pixel of interest is part of a large text or symbol character 95, then the pixel of interest may labeled as a "glyph" pixel 96. If it is determined 94 that the pixel of interest is not part of a large text or symbol character 97, then the contrast between the pixel of interest and the local background in a third neighborhood substantially proximate to the pixel of interest may be compared to a dynamic threshold 98. In some embodiments, if the contrast is greater than the dynamic threshold 99, then the pixel of interest may be labeled as a "glyph" pixel 96. If the contrast is less than or equal to the dynamic threshold 100, then the pixel of interest may be labeled as a "non-glyph" pixel 92. In some embodiments of the present invention, the first, the second and the third neighborhoods may be the same neighborhood. In alternative embodiments, some of the three neighborhoods may be distinct.

Figure 9:
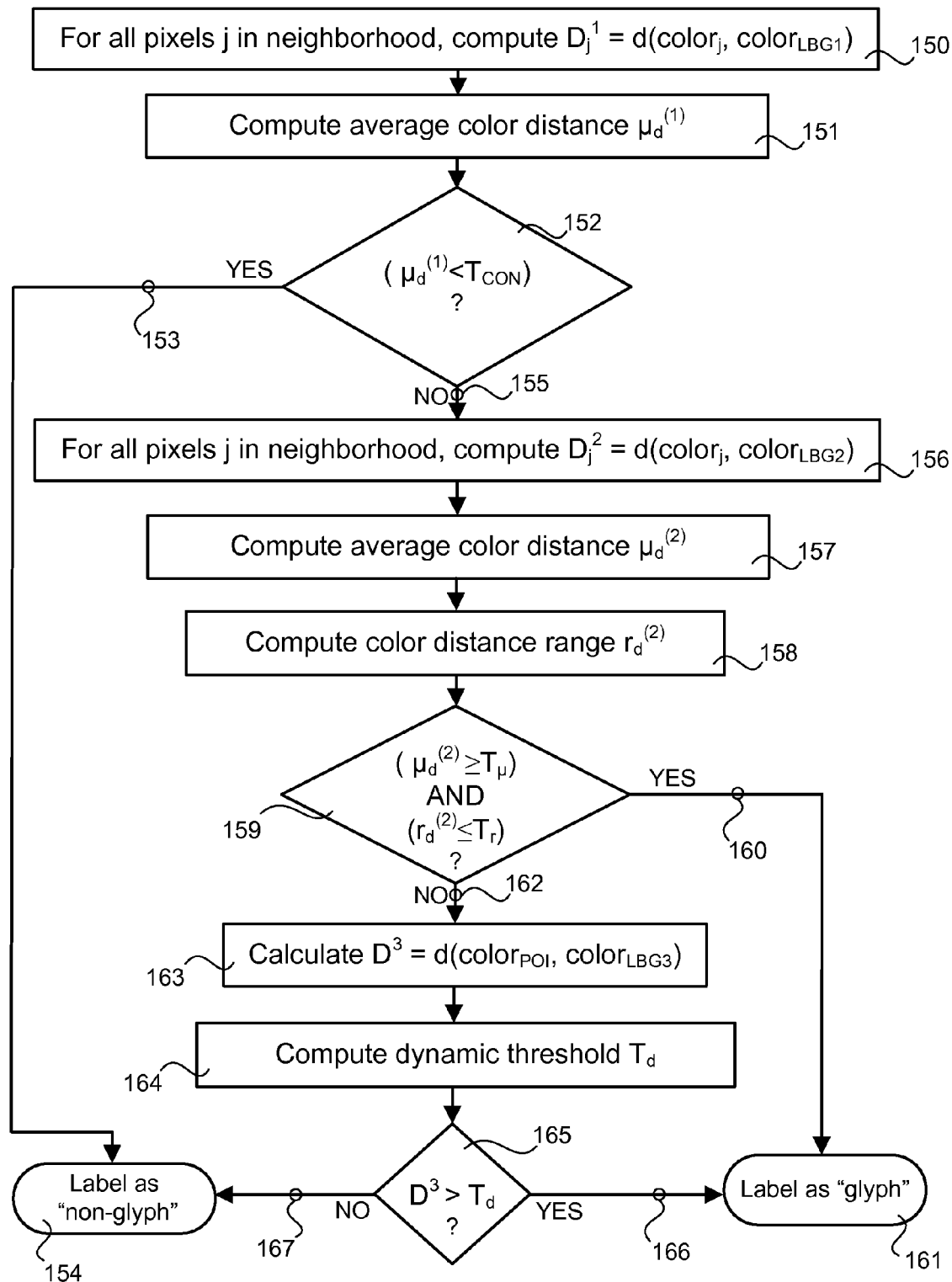
FIG. 9 is a diagram showing embodiments of the present invention comprising three sequential comparisons which may be used to classify a pixel of interest.

Some embodiments of the present invention may be described in relation to FIG. 9. In these embodiments of the present invention, a calculation of the contrast in a first neighborhood substantially proximate to the pixel of interest may be made. The contrast calculation may comprise computing 151 the average color distance of the pixels in the first neighborhood from the local background color estimate, $c_{LBG1}$, in the first neighborhood 150. In some embodiments, the local background color estimate may be available as a single color value, denoted $c_{LBG1}$ for the entire first neighborhood. In alternative embodiments, a local background color estimate may be available at each pixel in the first neighborhood. The color estimate of the local background in the first neighborhood may be calculated as a combination of the available local background color estimate values at each pixel in the neighborhood. Exemplary combinations include the mean, median, weighted mean and other combinations of the individual values.

The average color distance in the first neighborhood, $\mu_d^{(1)}$ may be calculated 151 according to:

$$\mu_d^{(1)} = \frac{\sum_{\forall j \in NH1} d(c_j, c_{LBG1})}{\text{\# of pixels in } NH1},$$

where NH1 denotes the first neighborhood, $c_j$ denotes the color value of pixel j where pixel j is in neighborhood NH1 and $d(\cdot,\cdot)$ is a distance measure. Exemplary distance measures may comprise a 2-dimensional city block distance measure between the chroma components of a luma-chroma-chroma color space representation, a 3-dimensional city block distance measure between the components of a 3-dimensional color space representation, a Euclidean distance measure, a weighted 2-dimensional city block distance measure between the chroma components of a luma-chroma-chroma color space representation, a weighted 3-dimensional city clock distance between the components of a 3-dimensional color space representation and other well-known-in-the-art distance measures.

For an N×M rectangular neighborhood, the average color distance may be calculated 151 according to:

$$\mu_d = \frac{\sum_{j=1}^{M \cdot N} d(c_j, c_{LBG1})}{M \cdot N}.$$

The calculated average color distance, $\mu_d^{(1)}$, may be compared 152 to a contrast threshold, denoted $T_{CON}$, to determine if the first neighborhood around the pixel of interest is of low contrast compared to the local background. In some embodiments, the contrast threshold, $T_{CON}$, may be a fixed threshold. In alternative embodiments, the contrast threshold, $T_{CON}$, may be an adaptive threshold. In some embodiments, if the average color distance, $\mu_d^{(1)}$, is small 153, which may indicate that the color of the pixel of interest is of low contrast compared to the background, then the pixel of interest may be labeled as a "non-glyph" pixel 154. If the average color distance, $\mu_d^{(1)}$, is not small 155, then additional processing may be required. In alternative embodiments of the present invention, if the average color distance, $\mu_d^{(1)}$, is small and the page background color, $c_{PBG}$, is not equal to the local background color estimate, $c_{LBG1}$, which may indicate that the color of the pixel of interest is of low contrast compared to the background and that the pixel of interest is on a halftone region, then the pixel of interest may be labeled as a "non-glyph" pixel 154. If the average color distance, $\mu_d^{(1)}$ is not small or the page background color, $c_{PBG}$, is equal to the local background color estimate, $c_{LBG1}$, then additional processing may be required 155.

In some embodiments of the present invention, if additional processing is required 155, then a determination of whether the pixel of interest is part of a large text or symbol character may be made. Determination of whether the pixel of interest is part of a large text or symbol character may comprise computing 157 the average color distance, $\mu_d$, as described above. The average color distance, $\mu_d$, may be computed 157 in a second neighborhood substantially proximate to the pixel of interest and may be denoted $\mu_d^{(2)}$. Determination of whether the pixel of interest is part of a large text or symbol character may further comprise computing 158 the range of color distances of the pixels in the second neighborhood surrounding the pixel of interest from the local background color estimate for the second neighborhood. The range of color distances may be determined 158 according to:

$$r_d^{(2)} = d_{max}^{(2)} - d_{min}^{(2)},$$

$$d_{min}^{(2)} = \min_j(d(c_j, c_{LBG2})), \quad d_{max}^{(2)} = \max_j(d(c_j, c_{LBG2}))$$

where and $c_{LBG2}$ is the local background color estimate in the second neighborhood. In some embodiments of the present invention, a pixel of interest may be considered part of a large text or symbol character if the range of color distances, $r_d^{(2)}$ is small and the average color distance, $\mu_d^{(2)}$ is large 160. This condition may be checked by comparing 159 $r_d^{(2)}$ to a color-range threshold, $T_r$, and $\mu_d^{(2)}$ to an average-distance threshold, $T_\mu$. If the range of color distances, $r_d^{(2)}$, is small and the average color distance, $\mu_d^{(2)}$, is large 160, then the pixel of interest may be labeled as a "glyph" pixel 161. If not 162, additional processing may be required.

In some embodiments, if it is determined that the pixel of interest is not part of a large text or symbol character 162, then the contrast between the pixel of interest and the local background color, $c_{LBG3}$, in a third neighborhood substantially proximate to the pixel of interest may be compared to a dynamic threshold 165. In some embodiments the contrast between the color of the pixel of interest and the local background color estimate may comprise the color distance, $D^3=d(c_{POI},c_{LBG3})$ 163. In some embodiments, the dynamic threshold, $T_d$, may be calculated 164 according to:

$$T_d = d_{min}^{(3)} + \frac{r_d^{(3)}}{R},$$

where $r_d^{(3)}$ and $d_{min}^{(3)}$ may be calculated as described above, and R is a predefined constant. In some embodiments of the present invention, if $D^3 > T_d$ 166, then the pixel of interest may be labeled a "glyph" pixel 161. Otherwise 167, the pixel of interest may be labeled a "non-glyph" pixel 154.

Figure 7:
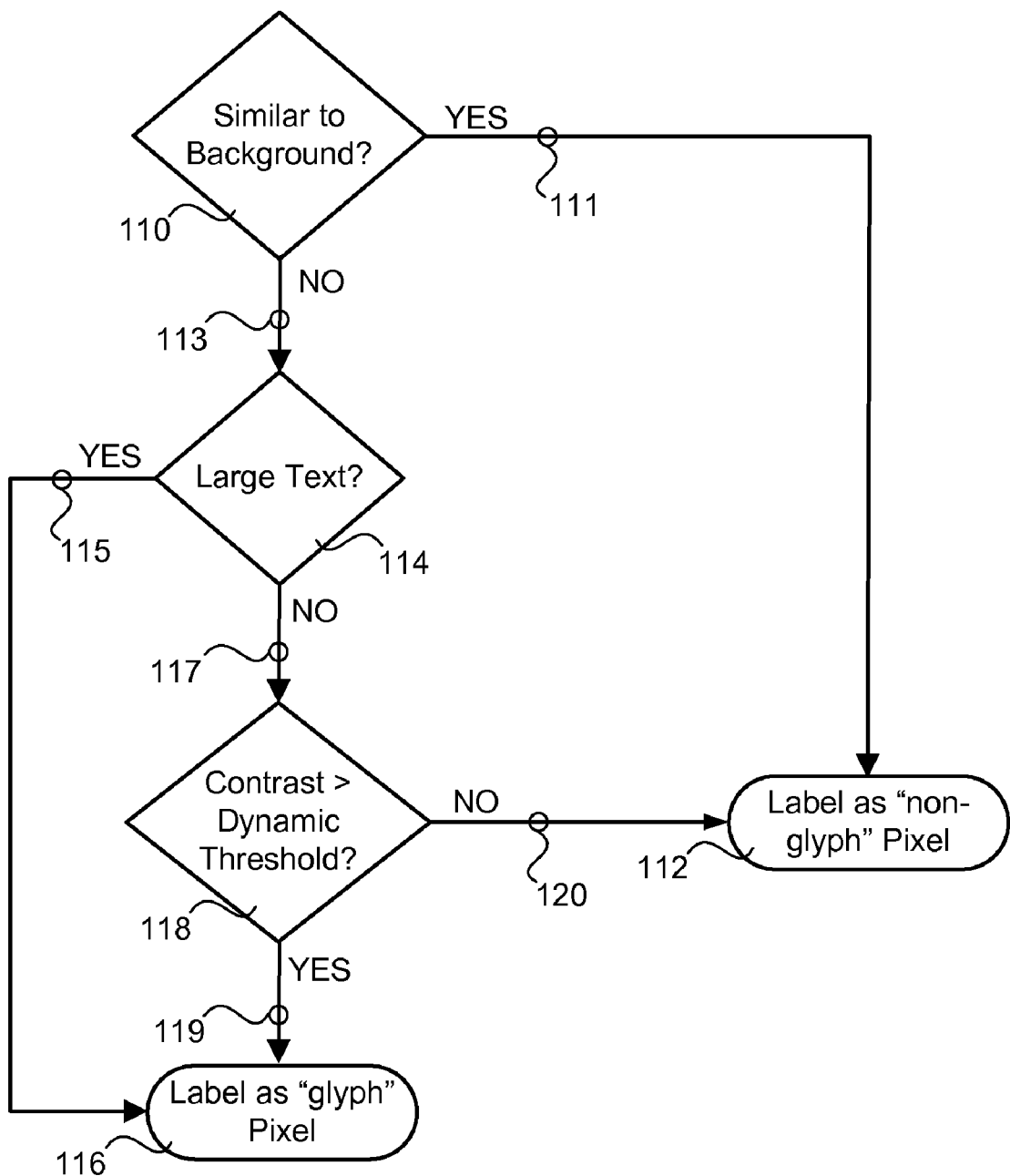
FIG. 7 is a diagram showing embodiments of the present invention comprising three sequential comparisons which may be used to classify a pixel of interest.

Some embodiments of the present may be described in relation to FIG. 7. The similarity of the color of a pixel of interest and the color of the local background in a first neighborhood substantially proximate to the pixel of interest may be determined 110. If the color of the pixel of interest and the color of the local background in the first neighborhood are similar 111, then the pixel of interest may be labeled as a "non-glyph" pixel 112. If the color of the pixel of interest and the color of the local background in the first neighborhood are not similar 113, then a determination of whether the pixel of interest is part of a large text or symbol character 114 may be made. Determination of whether the pixel of interest is part of a large text or symbol character 114 may comprise comparisons of pixel color values in a second neighborhood substantially proximate to the pixel of interest. If it is determined 114 that the pixel of interest is part of a large text or symbol character 115, then the pixel of interest may labeled as a "glyph" pixel 116. If it is determined 114 that the pixel of interest is not part of a large text or symbol character 117, then the contrast between the color of the pixel of interest and the local background color estimate in a third neighborhood substantially proximate to the pixel of interest may be compared to a dynamic threshold 118. In some embodiments, if the contrast is greater than the dynamic threshold 119, then the pixel of interest may be labeled as a "glyph" pixel 116. If the contrast is less than or equal to the dynamic threshold 120, then the pixel of interest may be labeled as a "non-glyph" pixel 112. In alternative embodiments, if the contrast is greater than or equal to the dynamic threshold, then the pixel of interest may be labeled as a "glyph" pixel 116. If the contrast is less than the dynamic threshold, then the pixel of interest may be labeled as a "non-glyph" pixel 112. In some embodiments of the present invention, the first, the second and the third neighborhoods may be the same neighborhood. In alternative embodiments, some of the three neighborhoods may be distinct.

Figure 10:
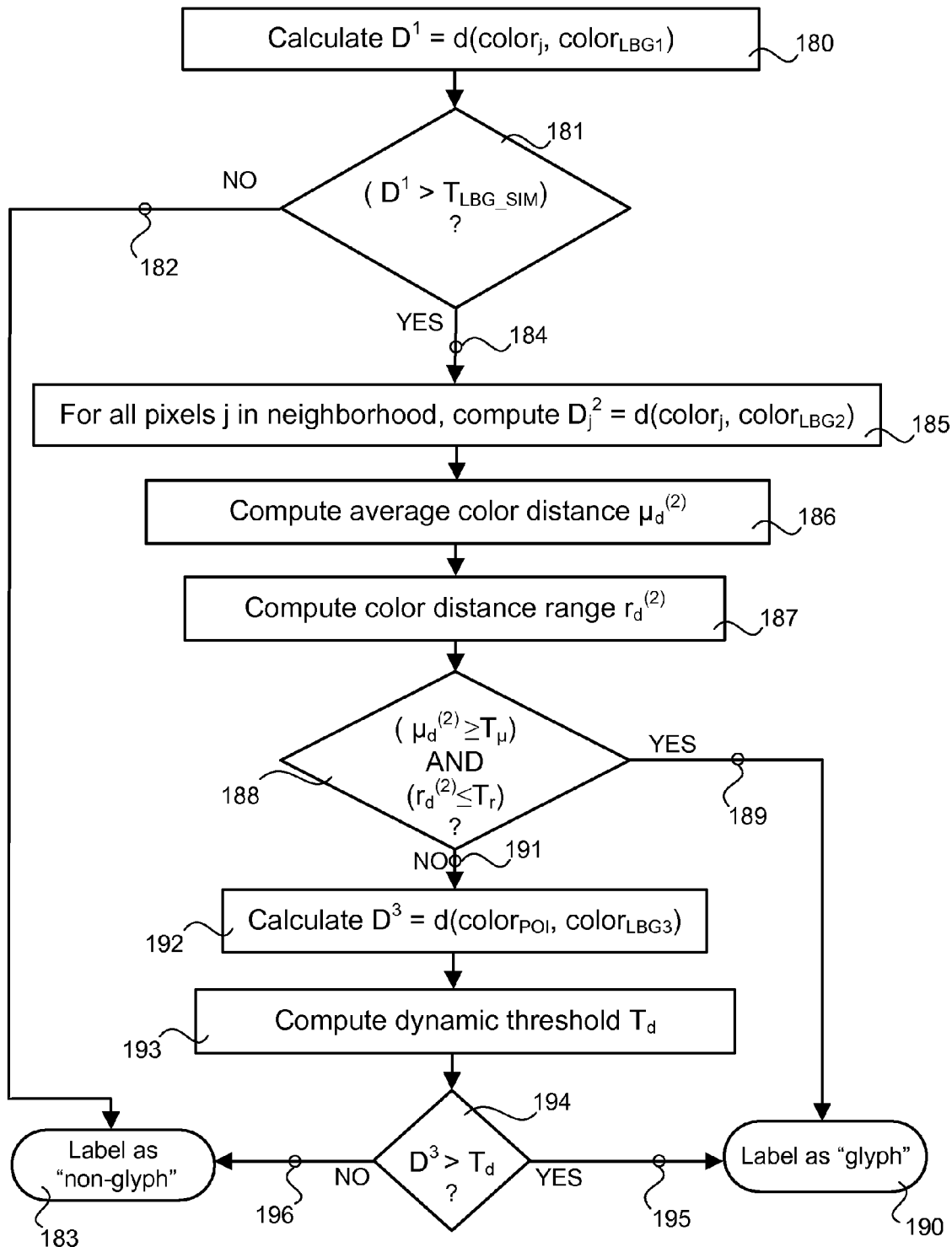
FIG. 10 is a diagram showing embodiments of the present invention comprising three sequential comparisons which may be used to classify a pixel of interest.

Some embodiments of the present invention may be described in relation to FIG. 10. For a pixel of interest in a digital image, the similarity between the color of a pixel of interest, denoted $c_{POI}$, and a color estimate of the local background, denoted $c_{LBG1}$, in a first neighborhood substantially proximate to the pixel of interest may be determined. The similarity may be calculated 180 as the distance, $D^1$, between the color of the pixel of interest, $c_{POI}$, and the color estimate of the local background in the first neighborhood, $c_{LBG1}$, where the distance between the two color values may be denoted $d(c_{POI}, c_{LBG1})$. In some embodiments, the local background color estimate may be available as a single color value, $c_{LBG1}$, for the entire first neighborhood. In alternative embodiments, a local background color estimate may be available at each pixel in the first neighborhood. The color estimate of the local background in the first neighborhood may be calculated as a combination of the available local background color estimate values at each pixel in the neighborhood. Exemplary combinations include the mean, median, weighted mean and other combinations of the individual local background estimate values.

Any distance measure known in the art may be used to determine the distance, $D^1=d(c_{POI},c_{LBG1})$, between the color of the pixel of interest, $c_{POI}$, and the local background color estimate, $c_{LBG1}$. Exemplary distance measures may comprise a 2-dimensional city block distance measure between the chroma components of a luma-chroma-chroma color space representation, a 3-dimensional city block distance measure between the components of a 3-dimensional color space representation, a Euclidean distance measure, a weighted 2-dimensional city block distance measure between the chroma components of a luma-chroma-chroma color space representation, a weighted 3-dimensional city clock distance between the components of a 3-dimensional color space representation and other well-known-in-the-art distance measures.

In some embodiments of the present invention, the distance, $D^1=d(c_{POI}, c_{LBG1})$, may be compared 181 to a similarity threshold, denoted $T_{LBG\_SIM}$, to determine if the color of the pixel of interest is substantially similar to the color of the background. In some embodiments, the similarity threshold, $T_{LBG\_SIM}$, may be a fixed threshold. In alternative embodiments, the similarity threshold, $T_{LBG\_SIM}$, may be an adaptive threshold. In some embodiments of the present invention, if the distance, $D^1=d(c_{POI},c_{LBG1})$, is less than the similarity threshold 182, $T_{LBG\_SIM}$, which may indicate that the color of the pixel of interest is close to the color of the local background in the neighborhood near to the pixel of interest, then the pixel of interest may be labeled as a "non-glyph" pixel 183. If the distance, $D^1=d(c_{POI}, c_{LBG1})$, is not small, 184 then additional processing may be required. In alternative embodiments, if the distance, $D^1=d(c_{POI}, c_{LBG1})$, is less than the similarity threshold, $T_{LBG\_SIM}$, which may indicate that the color of the pixel of interest is close to the color of the local background in the neighborhood near to the pixel of interest, and the local background color estimate, $c_{LBG1}$ is not equal to page background color, denoted $c_{PBG}$, then the pixel of interest may be labeled as a "non-glyph" pixel 183. In these alternative embodiments, if the distance, $D^1=d(c_{POI},c_{LBG1})$, is not small or $c_{LBG1}=c_{PBG}$, then additional processing may be required 184.

The average color distance in a neighborhood K, denoted $\mu_d(K)$, may be calculated according to:

$$\mu_d^{(K)} = \frac{\sum_{\forall j \in NHK} d(c_j, c_{LBGK})}{\text{\# of pixels in } NHK},$$

where NHK denotes the neighborhood K, $c_j$ denotes the color value of pixel j where pixel j is in neighborhood NHK and $d(\cdot,\cdot)$ is a distance measure. Exemplary distance measures may comprise a 2-dimensional city block distance measure between the chroma components of a luma-chroma-chroma color space representation, a 3-dimensional city block distance measure between the components of a 3-dimensional color space representation, a Euclidean distance measure, a weighted 2-dimensional city block distance measure between the chroma components of a luma-chroma-chroma color space representation, a weighted 3-dimensional city clock distance between the components of a 3-dimensional color space representation and other well-known-in-the-art distance measures.

For an N×M rectangular neighborhood, the average color distance may be calculated according to:

$$\mu_d = \frac{\sum_{j=1}^{M \cdot N} d(c_j, c_{LBG2})}{M \cdot N}.$$

In some embodiments of the present invention, if additional processing is required 184, then a determination of whether the pixel of interest is part of a large text or symbol character may be made. Determination of whether the pixel of interest is part of a large text or symbol character may comprise computing 186 the average color distance, $\mu_d$, as described above. The average color distance, $\mu_d$, may be computed 186 in a second neighborhood substantially proximate to the pixel of interest and may be denoted $\mu_d^{(2)}$. Determination of whether the pixel of interest is part of a large text or symbol character may further comprise computing 187 the range of color distances of the color of the pixels in the second neighborhood surrounding the pixel of interest from the local background color estimate. The range of color distances may be determined 187 according to:

$$r_d^{(2)} = d_{max}^{(2)} - d_{min}^{(2)},$$

$$d_{min}^{(2)} = \min_j(d(c_j, c_{LBG2})), \quad d_{max}^{(2)} = \max_j(d(c_j, c_{LBG2}))$$

where and $c_{LBG2}$ is the local background color estimate in the second neighborhood. In some embodiments of the present invention, a pixel of interest may be considered part of a large text or symbol character if the range of color distances, $r_d^{(2)}$ is small and the average color distance, $\mu_d^{(2)}$ is large 189. This condition may be checked by comparing 188 $r_d^{(2)}$ to a color-range threshold, $T_r$, and $\mu_d^{(2)}$ to an average distance threshold, $T_\mu$. If the range of color distances, $r_d^{(2)}$, is small and the average color distance, $\mu_d^{(2)}$, is large 189, then the pixel of interest may be labeled as a "glyph" pixel 190. If not 191, additional processing may be required.

In some embodiments, if it is determined that the pixel of interest is not part of a large text or symbol character 191, then the contrast between the pixel of interest and the local background color estimate, $c_{LBG3}$, in a third neighborhood substantially proximate to the pixel of interest may be compared to a dynamic threshold 194. In some embodiments the contrast between the pixel of interest and the local background may comprise the color distance, $D^3 = d(c_{POP}, c_{LBG3})$ 192. In some embodiments, the dynamic threshold, $T_d$, may be calculated 193 according to:

$$T_d = d_{min}^{(3)} + \frac{r_d^{(3)}}{R},$$

where $r_d^{(3)}$ and $d_{min}^{(3)}$ may be calculated as described above, and R is a predefined constant. In some embodiments of the present invention, if $D^3 > T_d$ 195, then the pixel of interest may be labeled a "glyph" pixel 190. Otherwise 196, the pixel of interest may be labeled a "non-glyph" pixel 183.

Some embodiments of the present invention may comprise receiving a color estimate for a local background region. Alternative embodiments of the present invention may comprise determining a color estimate for a local background region. Exemplary methods by which a local background color estimate may be determined may comprise the method disclosed in U.S. patent application Ser. No. 11/365,067 filed Feb. 28, 2006 which is hereby incorporated herein by reference, the method disclosed in U.S. patent application Ser. No. 11/424,290 filed Jun. 15, 2006 which is hereby incorporated herein by reference and other methods known in the art.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for classifying a pixel in a digital image, said method comprising:
   a) determining a pixel of interest in a digital image;
   b) evaluating a large-text-character condition for said pixel of interest and a first region substantially proximate to said pixel of interest, said first region comprising a first plurality of pixels and an associated first local background color estimate;
   c) classifying said pixel of interest as a first-category pixel when said large-text-character condition is satisfied;
   d) computing a dynamic threshold when said large-text-character condition is not satisfied, wherein said dynamic threshold is based on the color values in a second region substantially proximate to said pixel of interest, said second region comprising a second plurality of pixels and an associated second local background color estimate;
   e) calculating a first similarity measure between said second local background color estimate and the color of said pixel of interest;
   f) classifying said pixel of interest as a first-category pixel when said first similarity measure is greater than said dynamic threshold; and
   g) classifying said pixel of interest as a second-category pixel when said first similarity measure is not greater than said dynamic threshold.

2. A method according to claim 1, wherein said computing a dynamic threshold comprises:
   a) computing a distance between the color of each pixel in said second plurality of pixels and said second local background color estimate, thereby producing a plurality of color distances;
   b) determining the range of said plurality of color distances;
   c) determining the minimum-value color distance of said plurality of color distances;
   d) adjusting said range of said plurality of color distances by a constant, thereby producing an adjusted range; and
   e) adding said adjusted range to said minimum-value color distance, thereby producing said dynamic threshold.

3. A method according to claim 1, wherein said evaluating a large-text-character condition for said pixel of interest and said first region comprises:

a) computing a distance between the color of each pixel in said first plurality of pixels and said first local background color estimate, thereby producing a plurality of color distances;
b) determining an average of said plurality of color distances, thereby producing an first average color distance;
c) determining the range of said plurality of color distances;
d) comparing said average color distance to an average-distance threshold; and
e) comparing said range of said plurality of color distances to a color-range threshold.

4. A method according to claim 1, wherein said calculating a first similarity measure comprises calculating the distance between said second local background color estimate and the color of said pixel of interest.

5. A method according to claim 4, wherein said calculating the distance between said second local background color estimate and the color of said pixel of interest comprises a 3-dimensional city block distance calculation.

6. A method according to claim 1, wherein said first region and said second region are the same region.

7. A method according to claim 1, further comprising:
a) computing a distance between the color of each pixel in a third plurality of pixels comprising a third region substantially proximate to said pixel of interest and a third local background color estimate associated with said third region, thereby producing a plurality of color distances;
b) determining an average of said plurality of color distances;
c) evaluating said large-text-character condition only when said average of said plurality of color distances is not less than a contrast threshold; and
d) classifying said pixel of interest as a second-category pixel when said average of said plurality of color distances is less than said contrast threshold.

8. A method according to claim 1, further comprising:
a) computing a second similarity measure between a third local background color estimate for a third region substantially proximate to said pixel of interest;
b) evaluating said large-text-character condition only when said second similarity measure is larger than a similarity threshold; and
c) classifying said pixel of interest as a second-category pixel when said average of said second similarity measure is not larger than said similarity threshold.

9. A method according to claim 1, further comprising:
a) computing a distance between the color of each pixel in a third plurality of pixels comprising a third region substantially proximate to said pixel of interest and a third local background color estimate associated with said third region, thereby producing a plurality of color distances;
b) determining an average of said plurality of color distances;
c) evaluating said large-text-character condition only when said average of said plurality of color distances is not less than a contrast threshold or said third local background color estimate is equal to a page background color estimate; and
d) classifying said pixel of interest as a second-category pixel when said average of said plurality of color distances is less than said contrast threshold and said third local background color estimate is not equal to said page background color estimate.

10. A method according to claim 1, further comprising:
a) computing a second similarity measure between a third local background color estimate for a third region substantially proximate to said pixel of interest;
b) evaluating said large-text-character condition only when said second similarity measure is larger than a similarity threshold or said third local background color estimate is equal to a page background color estimate; and
c) classifying said pixel of interest as a second-category pixel when said average of said second similarity measure is not larger than said similarity threshold and said third local background color estimate is not equal to said page background color estimate.

11. A system for classifying a pixel in a digital image, said system comprising:
a) in an image processing device, a pixel selector for determining a pixel of interest in a digital image;
b) in said image processing device, a large-text evaluator for evaluating a large-text-character condition for said pixel of interest and a first region substantially proximate to said pixel of interest, said first region comprising a first plurality of pixels and an associated first local background color estimate;
c) in said image processing device, a first classifier for classifying said pixel of interest as a first-category pixel when said large-text-character condition is satisfied;
d) in said image processing device, a dynamic threshold calculator for computing a dynamic threshold when said large-text-character condition is not satisfied, wherein said dynamic threshold is based on the color values in a second region substantially proximate to said pixel of interest, said second region comprising a second plurality of pixels and an associated second local background color estimate;
e) in said image processing device, a first similarity measure calculator for calculating a first similarity measure between said second local background color estimate and the color of said pixel of interest;
f) in said image processing device, a second classifier for classifying said pixel of interest as a first-category pixel when said first similarity measure is greater than said dynamic threshold; and
g) in said image processing device, a third classifier for classifying said pixel of interest as a second-category pixel when said first similarity measure is not greater than said dynamic threshold.

12. A system according to claim 11, wherein said dynamic threshold calculator comprises:
a) a distance calculator for computing a distance between the color of each pixel in said second plurality of pixels and said second local background color estimate, thereby producing a plurality of color distances;
b) a range calculator for determining the range of said plurality of color distances;
c) a minimum-value calculator for determining the minimum-value color distance of said plurality of color distances;
d) an adjustor for adjusting said range of said plurality of color distances by a constant, thereby producing an adjusted range; and
e) an adder for adding said adjusted range to said minimum-value color distance, thereby producing said dynamic threshold.

13. A system according to claim 11, wherein said large-text evaluator comprises:
a) a distance calculator for computing a distance between the color of each pixel in said first plurality of pixels and said first local background color estimate, thereby producing a plurality of color distances;

b) an average calculator for determining an average of said plurality of color distances, thereby producing an first average color distance;

c) a range calculator determining the range of said plurality of color distances;

d) a first comparator for comparing said average color distance to an average-distance threshold; and e) a second comparator for comparing said range of said plurality of color distances to a color-range threshold.

14. A system according to claim 11, wherein said first similarity measure calculator comprises a distance calculator for calculating the distance between said second local background color estimate and the color of said pixel of interest.

15. A system according to claim 14, wherein said distance calculator comprises a 3-dimensional city-block distance calculation.

16. A system according to claim 11, wherein said first region and said second region are the same region.

17. A system according to claim 11, further comprising:

a) a color distance calculator for computing a distance between the color of each pixel in a third plurality of pixels comprising a third region substantially proximate to said pixel of interest and a third local background color estimate associated with said third region, thereby producing a plurality of color distances;

b) an average calculator for determining an average of said plurality of color distances;

c) said large-text evaluator evaluating said large-text-character condition only when said average of said plurality of color distances is not less than a contrast threshold; and d) a fourth classifier for classifying said pixel of interest as a second-category pixel when said average of said plurality of color distances is less than said contrast threshold.

18. A system according to claim 11, further comprising:

a) a second similarity calculator for computing a second similarity measure between a third local background color estimate for a third region substantially proximate to said pixel of interest;

b) said large-text evaluator evaluating said large-text-character condition only when said second similarity measure is larger than a similarity threshold; and c) a fourth classifier for classifying said pixel of interest as a second-category pixel when said average of said second similarity measure is not larger than said similarity threshold.

19. A system according to claim 11, further comprising:

a) a color distance calculator for computing a distance between the color of each pixel in a third plurality of pixels comprising a third region substantially proximate to said pixel of interest and a third local background color estimate associated with said third region, thereby producing a plurality of color distances;

b) an average calculator for determining an average of said plurality of color distances;

c) said large-text evaluator evaluating said large-text-character condition only when said average of said plurality of color distances is not less than a contrast threshold or said third local background color estimate is equal to a page background color estimate; and d) a fourth classifier for classifying said pixel of interest as a second-category pixel when said average of said plurality of color distances is less than said contrast threshold and said third local background color estimate is not equal to said page background color estimate.

20. A system according to claim 11, further comprising:

a) a second similarity measure calculator for computing a second similarity measure between a third local background color estimate for a third region substantially proximate to said pixel of interest;

b) said large-text evaluator evaluating said large-text-character condition only when said second similarity measure is larger than a similarity threshold or said third local background color estimate is equal to a page background color estimate; and c) a fourth classifier for classifying said pixel of interest as a second-category pixel when said average of said second similarity measure is not larger than said similarity threshold and said third local background color estimate is not equal to said page background color estimate.

21. A method for classifying a pixel in a digital image, said method comprising:

a) determining a pixel of interest in a digital image;

b) receiving a local background color estimate for a region substantially proximate to said pixel of interest, wherein said region comprises a plurality of pixels;

c) receiving a page background color estimate for said digital image;

d) calculating a similarity measure between said local background color estimate and the color of said pixel of interest, wherein said similarity measure comprising calculating the distance between the color of said local background color estimate and the color of said pixel of interest;

e) classifying said pixel of interest as a first-category pixel when said similarity measure is not greater than a similarity threshold and said local background color estimate is not equivalent to said page background color estimate;

f) calculating a contrast measure between a plurality of pixels in said region and said local background color when said similarity measure is greater than said similarity threshold or said local background color estimate is equivalent to said page background color estimate;

g) classifying said pixel of interest as a first-category pixel when said contrast measure is less than a contrast threshold and said local background color estimate is not equivalent to said page background color estimate;

h) evaluating a large-text-character condition for said pixel of interest when said contrast measure is not less than said contrast threshold or said local background color estimate is equivalent to said page background color estimate;

i) classifying said pixel of interest as a second-category pixel when said large-text-character condition is satisfied;

j) computing a dynamic threshold when said large-text-character condition is not satisfied, wherein computing said dynamic threshold comprises:

i) calculating a distance between the color of each of said plurality of pixels in said region and said local background color estimate, thereby producing a plurality of color distances;

ii) determining the range of said plurality of color distances;

iii) adjusting said range by a constant, thereby producing an adjusted range;

iv) determining the minimum-value color distance of said plurality of color distances; and v) adding said adjusted range and said minimum-value color distance, thereby producing said dynamic threshold;

k) classifying said pixel of interest as a second-category pixel when said similarity measure is greater than said dynamic threshold; and l) classifying said pixel of interest as a first-category pixel when said similarity measure is not greater than said dynamic threshold.

* * * * *

UNITED STATES PATENT AND TRADEMARK OFFICE
CERTIFICATE OF CORRECTION

PATENT NO.        : 7,856,142 B2
APPLICATION NO.   : 11/627456
DATED             : December 21, 2010
INVENTOR(S)       : Ahmet Mufit Ferman, Richard John Campbell and Jon M. Speigle Page 1 of 1

It is certified that error appears in the above-identified patent and that said Letters Patent is hereby corrected as shown below:

Column 8, lines 20 to 25, should read where $d^{(1)}_{min} = \min_j \left( d\left( c_j, c_{LBG1} \right) \right)$, $d^{(1)}_{max} = \max_j \left( d\left( c_j, c_{LBG1} \right) \right)$ and $c_{LBG1}$ is the local background color estimate in the Column 10, lines 55 to 59, should read where $d^{(2)}_{min} = \min_j \left( d\left( c_j, c_{LBG2} \right) \right)$, $d^{(2)}_{max} = \max_j \left( d\left( c_j, c_{LBG2} \right) \right)$ and $c_{LBG2}$ is the local background color estimate in the Column 13, lines 35 to 41, should read where $d^{(2)}_{min} = \min_j \left( d\left( c_j, c_{LBG2} \right) \right)$, $d^{(2)}_{max} = \max_j \left( d\left( c_j, c_{LBG2} \right) \right)$ and $c_{LBG2}$ is the local background color estimate in the Signed and Sealed this
First Day of March, 2011

David J. Kappos
*Director of the United States Patent and Trademark Office*